Sept. 7, 1965 L. W. JOHNSON 3,204,588
HERBICIDE DISPENSER
Original Filed Aug. 11, 1961
2 Sheets-Sheet 1
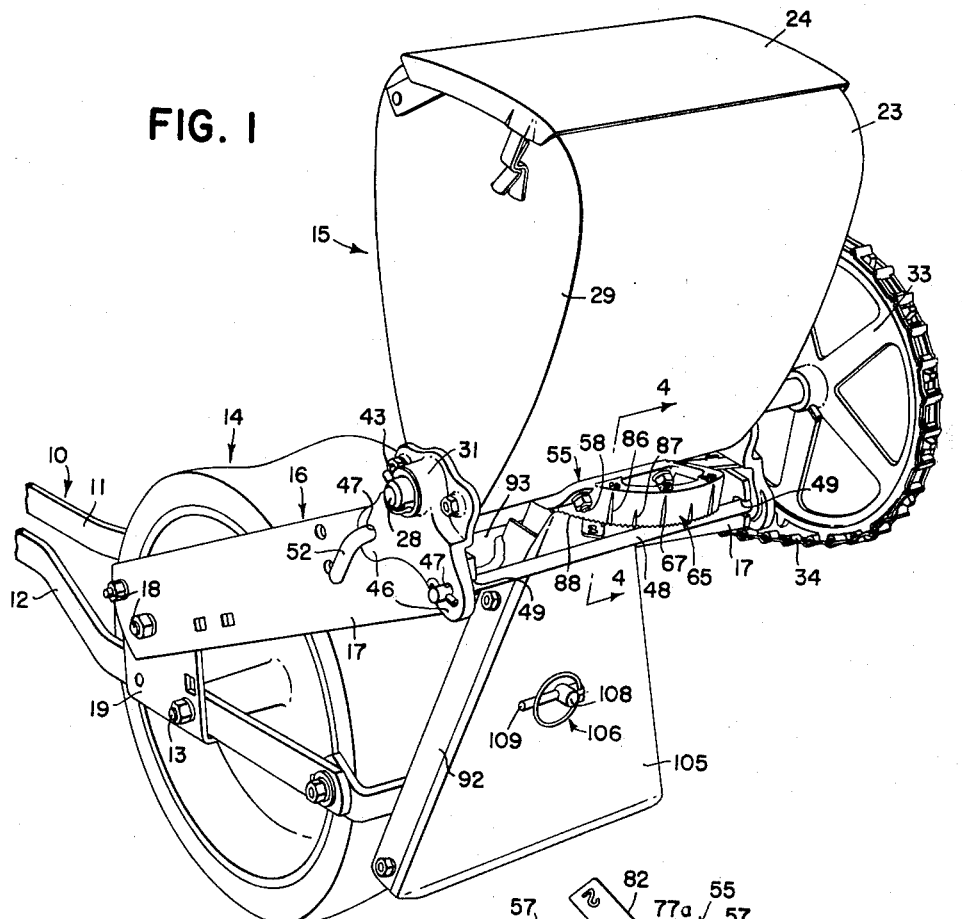
INVENTOR.
LESLIE W. JOHNSON Sept. 7, 1965   L. W. JOHNSON   3,204,588
HERBICIDE DISPENSER
Original Filed Aug. 11, 1961   2 Sheets-Sheet 2

*INVENTOR.*
LESLIE W. JOHNSON

United States Patent Office 3,204,588
Patented Sept. 7, 1965

3,204,588
HERBICIDE DISPENSER
Leslie W. Johnson, Moline, Ill., assignor to Deere & Company, Moline, Ill., a corporation of Delaware
Original application Aug. 11, 1961, Ser. No. 130,882. Divided and this application Apr. 30, 1964, Ser. No. 363,757
4 Claims. (Cl. 111—85)

This application is a division of U.S. patent application for a Herbicide Dispenser, Ser. No. 130,882, filed August 11, 1961, now abandoned.

This invention relates generally to agricultural implements and more particularly to implements for distributing granular herbicides and the like wherein accurate control of distribution of relatively small flows is necessary.

The object and general nature of this invention is the provision of a distributor that includes a hopper having an outlet opening, such as a slot, across which a flow control gate is movable. According to this invention the gate is in the form of a rotatable member having an eccentric cam-like section so constructed that a relatively appreciable amount of angular movement of the gate results in only a small change in the rate of flow. By having the gate move angularly through an appreciable distance for only a small change in the rate of flow, it becomes a simple matter to provide easily observable indices making it possible to secure accurately controlled variations in the rate of flow, even though the changes are quite small.

A further feature of this invention is the provision of flow controlling means of the above-mentioned character wherein the adjustable flow controlling gate is in the nature of a flat member having a plurality of cam-like sections, each with its own indicating and actuating arm movable successively across a stationary sector at one side of the hopper, the plurality of cam-like sections providing for a very fine and accurate control of the rate of distribution.

A further object of this invention is the provision of a novel diffuser apparatus in which the herbicide is diffused laterally and distributed uniformly over a relatively wide strip of ground. More particularly it is an object of this invention to provide a herbicide diffuser adapted to receive herbicide from a distributor and to direct the herbicide into contact with a plurality of diffusing means. Another object of this invention is the provision of a herbicide diffuser of relatively simple construction.

These and other objects and advantages of the present invention will be apparent to those skilled in the art after a consideration of the following detailed description, taken in conjunction with the accompanying drawings, in which:

FIG. 1 is a perspective view of a herbicide distributor in which the principles of this invention have been incorporated.

FIG. 2 is a fragmentary plan view of the metering outlet and rate control, showing the rotatable gate in one position for dispensing a relatively small flow of material.

FIG. 3 is a similar view showing the gate moved through approximately 240° from said one position and providing for a relatively large flow.

Figure 4:
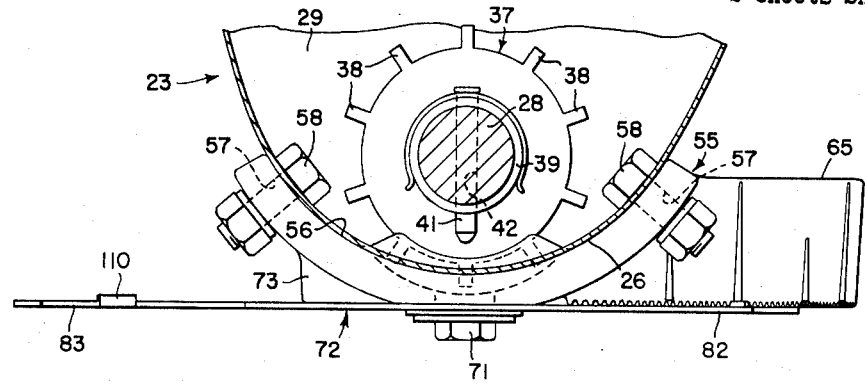
FIG. 4 is an enlarged sectional view taken generally along the line 4—4 of FIG. 1.
Figure 6:
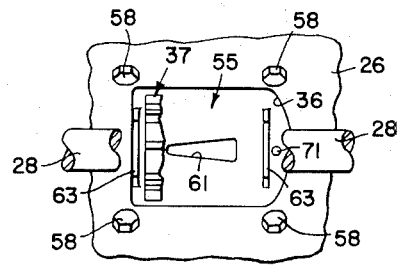
FIG. 6 is a fragmentary view looking from above toward the bottom of the hopper.

Referring first to FIG. 1, the herbicide distributor incorporating the principles of this invention is shown as including a press wheel frame 10 including bars 11 and 12 supported at the rear ends through an axle 13 on the press wheel 14, this being generally conventional single row planter construction. On the rear portions of the bars 11 and 12 is dispensing means indicated in its entirety by the reference numeral 15 and including a frame-work 16 that is made up of a pair of side bars 17 each connected at its forward end, as at 18 to a bracket 19. The brackets 19 are supported by any suitable means on the associated planter frame bars 11 and 12. The distributing unit 15 also includes a hopper 23 having a pivoted cover 24. The hopper is formed, as best shown in FIG. 4, with a rounded semi-cylindrical bottom portion 26 longitudinally of which a drive shaft 28 (FIG. 6) is disposed. The shaft 28 is carried on the end walls 29 of the hopper by suitable bearing means 31. One end of the shaft 28 extends laterally outwardly and carries a sprocket 33 that is driven by chain 34 from the press wheel 14 in any suitable way. Within the hopper 23, the bottom wall 26 thereof is provided with a discharge opening 36 (FIG. 6), and for positively feeding material into the opening 36, the shaft 28 carries a feed rotor 37 (FIG. 4) that is provided with a plurality of material-engaging fins 38. Preferably, the rotor 37 is constructed of rubber bonded to a sleeve 39 releasably held on the shaft 28 by a spring pin 41 extending through an opening 42 on the shaft 28. Similarly, each end portion of the shaft 28 is drilled to receive a cotter or other type of fastener, as indicated at 43. By removing the fasteners 43 and the spring pin 41, the shaft 28 may be withdrawn from the hopper, as when it is desired to remove feed rotor 37 and thoroughly clean the hopper.

Figure 5:
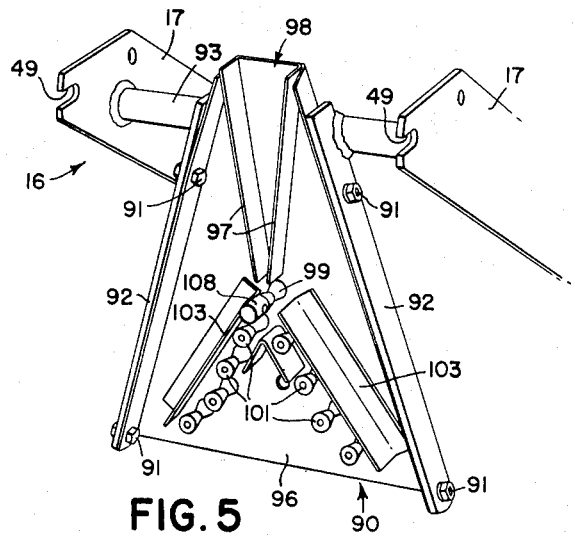
FIG. 5 is a fragmentary view of the material scattering means.

For the purpose just mentioned, it is desirable to be able to invert the hopper 23, and to this end each of the bearing brackets 31 (there being one at each end of the hopper 23) are formed with bracket extensions 46 that are provided with openings 47. A pivot pin 48 extends through one of the openings of each pair of openings 47 and through similar openings formed in the rear ends of the support plates 17, the rear portions of which are provided with open end slots 49 (FIGS. 1 and 5). The front openings 47 receive a releasable pin 52, normally held in position by suitable means, whereby, after the drive chain 34 has been disconnected, the pin 52 may be withdrawn and the hopper 23 then turned over, utilizing pin 48 as a pivot, to permit cleaning out all material from the hopper. If desired, the hopper 23 may be completely detached from the frame 16 by shifting the hopper rearwardly to carry the rear pin 48 out of the rear slots 49.

Material that passes through the hopper bottom opening 36 by virtue of the action of the rotor 37 is controlled by adjustable gate means that will now be described.

Referring first to FIGS. 2–4, the lower portion of the hopper 23 carries a metering outlet and rate control casting indicated in its entirety by the reference numeral 55. This member is provided with an upper curved surface 56 that conforms to the curvature of the bottom of the hopper, and the member 55 is apertured as at 57, to receive bolts 58 or other fasteners by which the casting member 55 is secured in leak-tight relation to the hopper bottom. The member 55 is provided with a slot 61 that extends generally parallel to the axis of curvature of the surface 56, and therefore generally parallel to the axis of the drive shaft 28. The surface 56 is also provided with fins or ribs 63 between which the feed rotor 37 moves. A stationary sector 65 forms a part of the member 55 and, as best seen in FIG. 1, extends outwardly from the rear side of the hopper and carries indices and notches for a purpose that will be explained below.

By means of a pivot stud 71 a three-lobed metering gate 72 is rotatably connected with the lower side of the casting member 55, the latter having a flattened or planar section 73 (FIG. 4) to receive the metering gate 72, which preferably is formed as a planar sheet metal member. The latter is provided with three cam-like flow-controlling sections 76, 77 and 78 (FIGS. 3 and 4) having radially outer edges which progressively increase in radial extent, as will be seen from FIGS. 2 and 3. Between the adjacent gate sections a generally radially outwardly extending indicating arm is disposed. The arm between sections 76 and 78 (FIG. 2) is indicated at 81 and bears the index "1." The arm between the sections 77 and 78 is indicated at 82 and bears the index number "2." The arm between sections 76 and 77 is indicated at 83 and bears the index numeral "3."

When the metering gate 72 is rotated to the position shown in FIG. 2, in which the cam section 78 extends across the opening 61 in the casing member 55, material is dispensed at a relatively small rate. This is because the cam section 78 of the gate 72 covers most of the associated bottom opening 61, as will be seen from FIG. 2. The radially outer edge of the cam section 78 that is indicated at 78a is disposed at a greater radial distance from the stud 71 than the radially outer edge indicated at 78b. When the edge 78a is disposed at the small end of the slot 61 (FIG. 2) material is dispensed at the minimum rate, and as the gate 72 is then rotated to bring the edge section 78b under the opening 61, the rate of flow is increased. In order to provide an index for the rate of flow, the arm 81 is arranged to move along the sector 65 from the point leftwardly of the index character "10," as indicated in dotted lines, FIG. 2, partially underneath the casting member 55, toward the index character "30." The edge of the sector 65 is provided with four relatively long lines or ribs 86 and intermediate half-length lines 87, as will be seen from FIG. 1. Additionally, small notches 88 are provided along the lower edge of the flange of the sector 65.

Referring again to FIG. 2, it will be seen that the radial distance of the spiral cam-like edge 78b is substantially the same as the adjacent spiral cam-like edge 77a, and that the radial outer edge of the section 77 decreases progressively in radial distance from the pivot 71 from the edge 77a to the edge 77b adjacent the arm 83. Likewise, the radial distance of the spiral cam-like edge 77b from the pivot 71 is substantially the same as the radial distance of the spiral cam like edge 76a and the radial outer edge of the section 76 decreases in radial distance from the pivot 71 to the edge 76b.

Thus as the position of the gate member 76 is changed by rotating the same about the pivot 71, the arms 81, 82 and 83 serve to indicate different rates of flow and that the rate varies substantially uniformly as the gate member 72 is rotated from one position to the other.

Material discharged by the rotor 37 through the opening 61, under the control of gate 72, drops downwardly into a downwardly diverging diffuser 90 (FIG. 5) that is releasably carried, as by bolts 91, on a pair of downward diverging bars 92 fixed at their upper ends to a cross shaft 93 that at its ends is connected, as by welding, to the upper portions of the frame bars 17. The diffuser 90 includes a back wall structure 96 to the upper portion of which downwardly converging walls 97 are fixed, the walls 97 forming a portion of a generally channel-shaped member 98 that is welded to the upper portion of a back plate 96. The material dispensed through the opening 61 falls between the walls 97 onto an hourglass shaped pin or stud 99 fixed to the wall 96 and from which the dispensed material falls onto a plurality of other hourglass shaped pins or studs 101 arranged as shown in FIG. 5, whereby the material to be dispensed is diffused laterally and distributed uniformly over a relatively wide strip of ground. Angle members 103 and downwardly diverging lug 104 are welded to the wall 96 in spaced relation with respect to the hourglass shaped studs 101 so as to redirect the falling material onto the studs 101. A cover 105 (FIG. 1) is fixed in place over the diffuser by means of a quick attachable connector 106. Preferably, the center stud 99 includes an extension 108 that passes through an opening in the cover 105 and is apertured to receive the pin 109 of the fastener 105. The inner ends of the deflector studs or pins are tapped and the members 99 and 101 are fastened in place to the back wall 96 by screws or the like.

Tabs or detents 110 on each of the arms 81, 82 and 83 cooperate with the notches 88 to hold the adjustable gate 72 in different positions.

While I have shown and described above a preferred structure in which the principles of the present invention have been incorporated, it is to be understood that my invention is not to be limited to the particular details shown and described, but that, in fact, widely different means may be employed in the practice of the broader aspects of my invention.

What I claim, therefore, and desire to secure by Letters Patent is:

1. A herbicide diffuser comprising: a generally vertically disposed structure having a plurality of outwardly projecting pins disposed in a generally inverted V-shaped configuration, downwardly diverging outwardly projecting walls secured to said structure, the upper end of said diverging walls being spaced laterally outwardly of the apical pin, a downwardly diverging outwardly projecting lug secured to said structure, the apical portion of said lug being spaced below the apical pin, a cover adapted to be placed in face-to-face contact with the outer edges of said pins, walls, and lug, and means to hold said cover in its assembled position, said means comprising apertured extension means on said apical pin, an aperture in said cover adapted to receive said extension means, and fastener means adapted to pass through the aperture in said pin extension and to hold the cover in its assembled relationship.

2. A herbicide diffuser comprising: a generally vertically disposed structure having a back to which is secured in its upper portion downwardly converging walls, a plurality of hourglass shaped pins secured to said back wall and disposed in a generally inverted V-shaped configuration, the apical pin being centrally located below said converging walls, downwardly diverging walls secured to said back wall, the upper end of said diverging walls being spaced below and laterally outwardly of the lower ends of said converging walls and of said pins, a downwardly diverging lug secured to said back wall, the apical portion of said lug being spaced below said apical pin, a cover adapted to be assembled over said pins and said walls, and means to hold said cover in its assembled position, said means comprising apertured extension means on said apical pin, an aperture in said cover adapted to receive said pin, and fastener means adapted to pass through the aperture in said pin extension and to hold the cover in its assembled relationship, the parts being so arranged and constructed that material dispensed between said converging walls is diffused laterally and distributed uniformly over a relatively wide strip of ground.

3. In combination, support means, a press wheel for a planter rotatably carried by said support means, fore-and-aft extending bracket means secured at one end to said support means, a hopper adapted to receive granular herbicide material, means to secure said hopper to the other end of said bracket means, an opening in the bottom of the hopper through which the granular herbicide material may normally flow, means to vary the effective cross-sectional area of the opening whereby the rate of flow of the material through the opening may be varied, support means fixedly mounted on said other end of said bracket means, a herbicide diffuser means fixedly mounted on said support means and having a relatively narrow upper opening and a relatively wide lower opening, the relatively narrow opening being disposed adjacent the opening in said hopper, and the relatively wide lower opening being disposed behind and in line with said press wheel, and means disposed between the upper and lower openings in said diffuser to receive and to diffuse the herbicide.

4. A distributing apparatus for a planter comprising: a support for a planter press wheel, a press wheel rotatably carried by said support, rearwardly extending bracket means secured at its forward end to said support, a hopper disposed adjacent the rear side of the wheel, means to secure said hopper to the rear end of said bracket, an opening in the bottom of the hopper through which the granular herbicide material may normally flow, means to vary the effective cross-sectional area of the opening whereby the rate of flow of the material through the opening may be varied, support means fixedly mounted on the other end of said bracket means, a herbicide diffuser means fixedly mounted on said support means in a downward continuance from the hopper and in a close trailing relation to the wheel having a relatively narrow upper opening in registry with the hopper opening, and a relatively wide lower opening disposed behind and in line with said press wheel, and means disposed between the upper and lower openings in said diffuser to receive and to diffuse the herbicide.

References Cited by the Examiner
UNITED STATES PATENTS

| Re. 7,191 | 6/76 | Gorham | 275—14 |
| 156,688 | 11/74 | Workman | 275—14 |
| 1,618,443 | 2/27 | Knight | 275—14 |

LOUIS J. DEMBO, *Primary Examiner.*

EVERETT W. KIRBY, *Examiner.*